US010451010B2

(12) United States Patent
Dudar

(10) Patent No.: US 10,451,010 B2
(45) Date of Patent: Oct. 22, 2019

(54) SYSTEMS AND METHODS FOR DIAGNOSING COMPONENTS IN A VEHICLE EVAPORATIVE EMISSIONS SYSTEM

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 273 days.

(21) Appl. No.: 15/248,817

(22) Filed: Aug. 26, 2016

(65) Prior Publication Data

US 2018/0058384 A1 Mar. 1, 2018

(51) Int. Cl.
| F02D 41/00 | (2006.01) |
| F02D 41/14 | (2006.01) |
| F02M 25/08 | (2006.01) |
| F02D 41/22 | (2006.01) |

(52) U.S. Cl.
CPC ..... *F02M 25/0809* (2013.01); *F02D 41/0032* (2013.01); *F02D 41/0042* (2013.01); *F02D 41/1454* (2013.01); *F02D 41/221* (2013.01); *F02D 41/222* (2013.01);
(Continued)

(58) Field of Classification Search
CPC ............. F02D 41/0032; F02D 41/0037; F02D 41/0043; F02D 41/1454; F02D 41/221; F02D 41/222; F02M 25/0809; F02M 25/0854; G04M 2025/0881; Y02T 10/40
See application file for complete search history.

(56) References Cited

U.S. PATENT DOCUMENTS

| 4,732,588 A | 3/1988 | Covert et al. |
| 4,864,103 A | 9/1989 | Bishop et al. |
| 6,102,018 A | 8/2000 | Kerns et al. |

(Continued)

FOREIGN PATENT DOCUMENTS

| DE | 102010006042 A1 | 8/2011 |
| WO | 9925965 A1 | 5/1999 |

OTHER PUBLICATIONS

Dudar, Aed M., et al., "Systems and Methods for Targeted Heating in an Evaporative Fuel Vapor Canister Purge," U.S. Appl. No. 15/190,068, filed Jun. 22, 2016, 58 pages.

*Primary Examiner* — Robert T Nguyen
(74) *Attorney, Agent, or Firm* — Julia Voutyras; McCoy Russell LLP

(57) ABSTRACT

Methods and systems are provided for conducting a canister purging operation and for rationalizing components of a vehicle evaporative emission system. In one example, after completion of a refueling event, a first fuel vapor canister purge operation is conducted to desorb hydrocarbon light ends from the fuel vapor canister, and subsequently the canister is heated to desorb hydrocarbon heavy ends from the canister, which are routed to a hydrocarbon sensor to rationalize the hydrocarbon sensor, before being purged to engine intake in a second purging operation. In this way, a fuel vapor storage canister may be thoroughly cleaned of hydrocarbon light ends and hydrocarbon heavy ends, while additionally indicating whether a canister heating element, and a hydrocarbon sensor positioned between the canister and atmosphere, are functioning as desired.

20 Claims, 4 Drawing Sheets

(52) U.S. Cl.
CPC ..... *F02M 25/0854* (2013.01); *F02D 41/0037* (2013.01); *F02M 2025/0881* (2013.01); *Y02T 10/40* (2013.01)

(56) References Cited

U.S. PATENT DOCUMENTS

| | | | |
|---|---|---|---|
| 6,230,693 B1 | 5/2001 | Meiller et al. | |
| 6,279,548 B1 | 8/2001 | Reddy | |
| 6,321,727 B1* | 11/2001 | Reddy | F02M 25/0809 123/520 |
| 7,114,492 B2* | 10/2006 | Reddy | F01N 5/02 123/518 |
| 7,444,996 B2 | 11/2008 | Potier | |
| 7,467,620 B1* | 12/2008 | Reddy | B60K 6/48 123/519 |
| 9,050,885 B1* | 6/2015 | Dudar | B60W 20/00 |
| 2004/0261506 A1* | 12/2004 | Amlin | G01M 3/025 73/49.7 |
| 2007/0079705 A1 | 4/2007 | Tolles | |
| 2007/0266997 A1 | 11/2007 | Clontz, Jr. et al. | |
| 2008/0041226 A1 | 2/2008 | Hiltzik et al. | |
| 2008/0302341 A1* | 12/2008 | Reddy | B60K 6/48 123/520 |
| 2009/0084363 A1 | 4/2009 | Reddy | |
| 2009/0320805 A1* | 12/2009 | Lang | F02M 25/0854 123/518 |
| 2010/0252006 A1* | 10/2010 | Reddy | B60K 15/03504 123/519 |
| 2012/0260893 A1 | 10/2012 | Makino | |
| 2013/0152905 A1 | 6/2013 | Woods et al. | |
| 2015/0090232 A1 | 4/2015 | Peters et al. | |
| 2015/0090233 A1 | 4/2015 | Dudar et al. | |
| 2015/0120110 A1 | 4/2015 | Yang et al. | |
| 2015/0120165 A1* | 4/2015 | Glinsky | G07C 5/006 701/101 |
| 2015/0122229 A1* | 5/2015 | Dudar | F02M 25/0818 123/518 |
| 2015/0158378 A1* | 6/2015 | Dudar | B60K 15/03 701/22 |
| 2015/0211952 A1* | 7/2015 | Yang | G01M 3/025 73/40.5 R |
| 2015/0322901 A1* | 11/2015 | Kragh | F02M 25/08 123/520 |
| 2016/0084208 A1* | 3/2016 | Makino | F02M 25/0854 96/146 |
| 2016/0138528 A1* | 5/2016 | Burleigh | F02M 25/0809 123/518 |
| 2016/0341156 A1* | 11/2016 | Yang | F02M 25/0854 |
| 2018/0099856 A1* | 4/2018 | Dudar | B67D 7/049 |
| 2018/0187614 A1* | 7/2018 | Dudar | F02D 41/004 |
| 2018/0195467 A1* | 7/2018 | Dudar | F02M 25/0809 |

* cited by examiner

SYSTEMS AND METHODS FOR DIAGNOSING COMPONENTS IN A VEHICLE EVAPORATIVE EMISSIONS SYSTEM

FIELD

The present description relates generally to methods and systems for diagnosing components related to capturing and storing fuel vapors in a vehicle evaporative emissions system.

BACKGROUND/SUMMARY

Vehicle evaporative emission control systems may be configured to store refueling vapors, running-loss vapors, and diurnal emissions in a fuel vapor canister, and then purge the stored vapors during a subsequent engine operation. The stored vapors may be routed to engine intake for combustion, further improving fuel economy for the vehicle. In a typical canister purge operation, a canister purge valve coupled between the engine intake and the fuel vapor canister is opened, allowing for intake manifold vacuum to be applied to the fuel vapor canister. Fresh air may be drawn through the fuel vapor canister via an open canister vent valve. This configuration facilitates desorption of stored fuel vapors from the adsorbent material in the canister, regenerating the adsorbent material for further fuel vapor adsorption.

However, air flow through the fuel vapor canister is not typically uniform, and thus the canister may never be purged out completely. Furthermore, while hydrocarbon light ends (e.g., propane, butane) are easily desorbed by drawing fresh air through the fuel vapor storage canister, heavy ends (e.g., heptane, octane) are more difficult to desorb. For example, heavy ends may require a motive force in the form of heat applied to the fuel vapor storage canister for desorption. As such, regions of the canister that are not properly cleaned may contribute to bleed emissions when a vehicle is parked for a duration in a climate that may contribute to heat-induced desorption of residual hydrocarbon vapor. Such issues are particularly relevant in hybrid electric vehicles (HEVs), or other vehicles with limited engine run time, as with limited engine run time, opportunities for canister purging are in turn also limited.

US 20130152905 A1 teaches a hydrocarbon sensor in an extended range electric vehicle configured to determine when a fuel vapor canister is saturated with fuel vapors, such that the engine is only activated when needed in order to purge the fuel vapor canister and thus prevent bleed emissions. However, the inventors herein have recognized potential issues with such an approach. For example, if the hydrocarbon sensor fails, then undesired evaporative emissions may be released to the environment. Furthermore, as the hydrocarbon sensor is configured to indicate when the canister is saturated with fuel vapors, such a hydrocarbon sensor may in some examples never see hydrocarbon vapors until breakthrough occurs, thus resulting in no potential opportunities to rationalize the functionality of the hydrocarbon sensor. If the hydrocarbon sensor is not functioning properly at the time of breakthrough, undesired evaporative emissions may result.

Furthermore, various strategies have been proposed for electrical heating of the fuel vapor storage canister to improve desorption of fuel vapors stored in a fuel vapor canister. However, the inventors have herein additionally recognized potential issues with such approaches. For example, as light ends are readily desorbed by the drawing of fresh air across the fuel vapor canister, heating of the canister to promote desorption of both hydrocarbon heavy ends and light ends may be undesirable due to the amount of electrical power thus required. A desirable alternative would involve utilizing a canister heater to specifically desorb hydrocarbon heavy ends, for example. In addition, under conditions where a fuel vapor canister heater may be utilized, it may be desirable to indicate whether the fuel vapor canister heater is functioning as desired.

Thus, there is a need to provide an ability to rationalize a hydrocarbon sensor in order to reliably assess whether bleed emissions are occurring from the fuel vapor canister. Furthermore, there is a need to be able to thoroughly clean the fuel vapor canister, without requiring an excessive amount of electrical power. Additionally, in a case wherein a fuel vapor canister heater is utilized, there is a need to reliably assess whether the canister heater is functioning as desired. The inventors herein have recognized these issues, and have developed systems and methods to at least partially address such issues. In one example, a method is provided, comprising capturing and storing fuel vapors in a fuel vapor storage canister positioned in a vehicle evaporative emission system, the fuel vapor canister removably coupled to a fuel tank that provides fuel to an engine that propels the vehicle; actively routing fuel vapors from the fuel vapor canister into a vent line coupling the fuel vapor canister to atmosphere; and diagnosing one or more evaporative emission system components responsive to the routing.

As one example, actively routing fuel vapors from the fuel vapor canister into the vent line includes activation of a canister heating element coupled to and/or within the fuel vapor canister to promote desorption of fuel vapors stored in the fuel vapor canister. During the actively routing the fuel vapors into the vent line, the vent line may be monitored via a hydrocarbon sensor for the presence of fuel vapors subsequent to activation of the canister heating element, wherein diagnosing one or more evaporative emission system components includes indicating that both the canister heating element and the hydrocarbon sensor are functioning as desired responsive to an indication of the presence of fuel vapors in the vent line.

As another example, the method includes purging fuel vapors to an intake manifold of the engine, wherein the purging is conducted responsive to either an indication of fuel vapors in the vent line, or responsive to a predetermined time duration elapsing subsequent to activation of the canister heating element without an indication of fuel vapors in the vent line. In some examples, purging fuel vapors to the intake manifold of the engine prior to activating the canister heating element promotes desorption of hydrocarbon light ends from the fuel vapor canister, wherein diagnosing the canister heating element and hydrocarbon sensor is not conducted during or prior to purging of hydrocarbon light ends. In such an example, activating the canister heating element subsequent to purging the fuel vapor canister of hydrocarbon light ends serves to promote desorption of hydrocarbon heavy ends stored within the fuel vapor canister that are not purged during purging of the fuel vapor canister in the absence of activation of the canister heating element. By selectively purging the fuel vapor canister to desorb hydrocarbon light ends without activation of the canister heating element, and subsequently activating the canister heating element to desorb hydrocarbon heavy ends, thorough canister cleaning may be accomplished, battery power may be conserved, and it may be determined whether the canister heating element and hydrocarbon sensor are functioning as desired.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
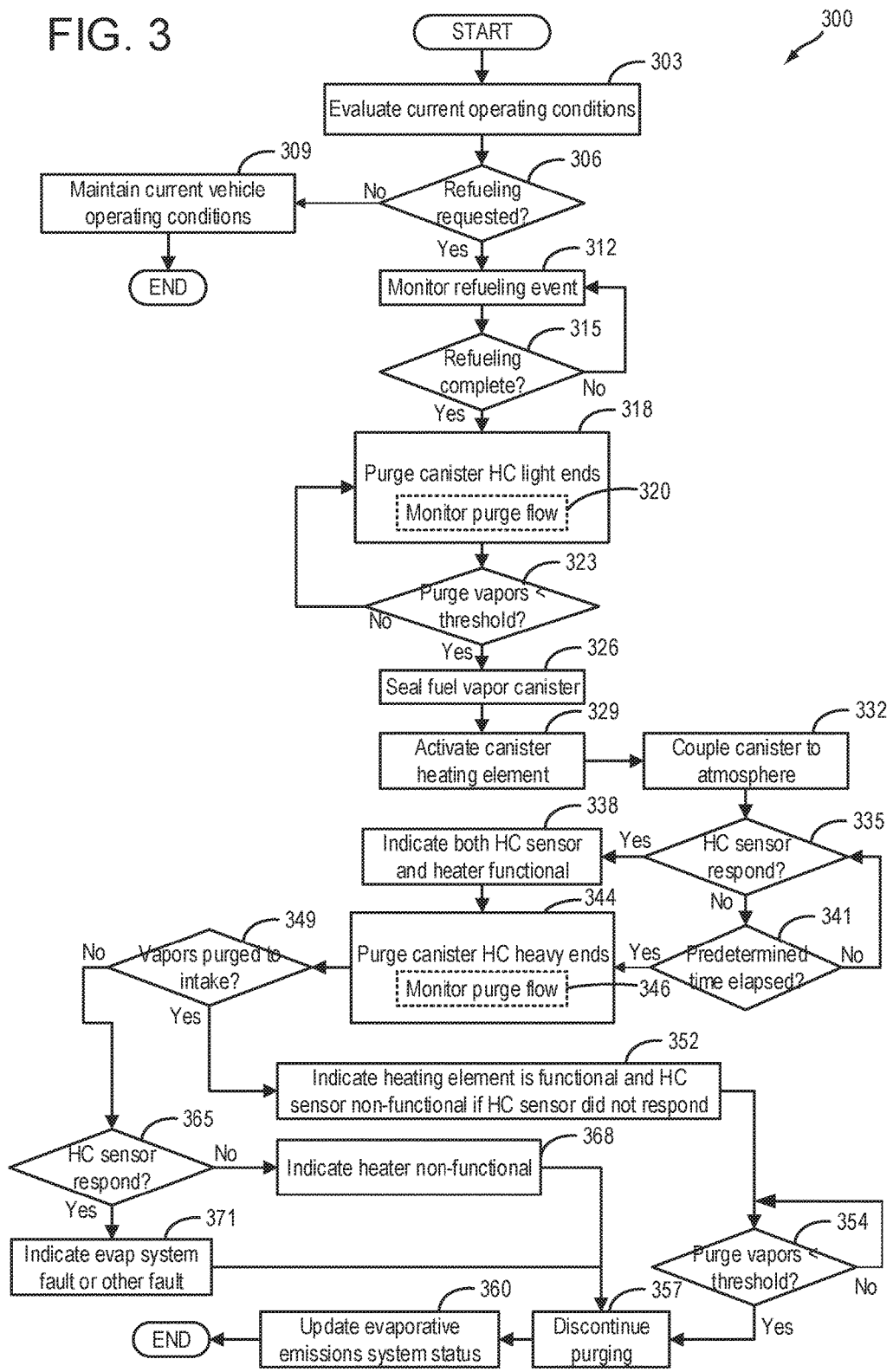
FIG. 3 shows a high level flowchart for an example method for purging a fuel vapor canister, and for conducting rationality tests on evaporative emission system components.
Figure 4:
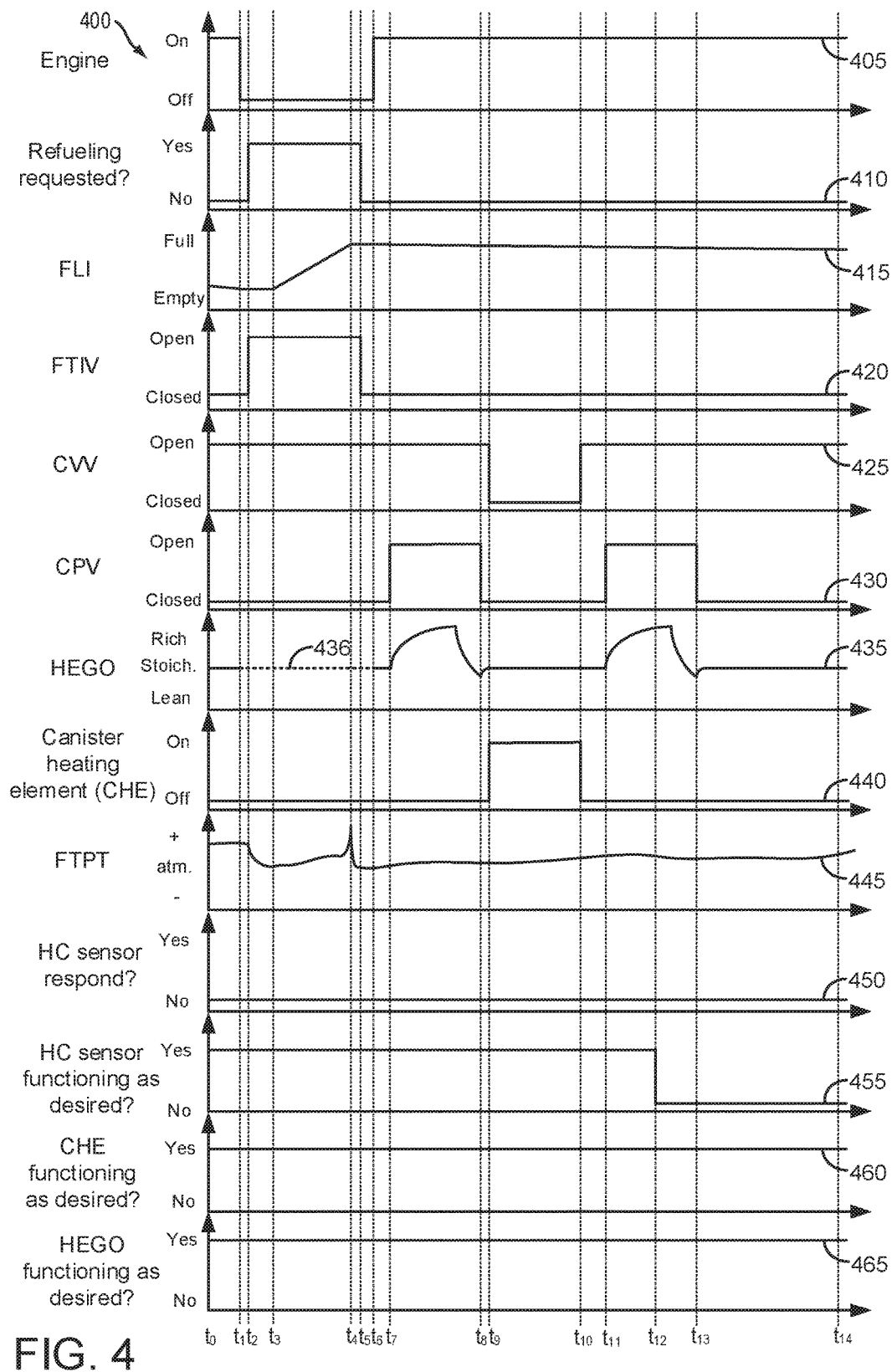
FIG. 4 shows an example timeline for conducting a fuel vapor canister purging operation while simultaneously rationalizing evaporative emission system components.

This detailed description relates to systems and methods for purging a fuel vapor canister in a vehicle evaporative emissions system, where the canister is thoroughly purged of both hydrocarbon light ends and hydrocarbon heavy ends, and where a canister heating element and a hydrocarbon sensor are both rationalized during the purging procedure. The systems and methods may be applied to a hybrid vehicle, such as the hybrid vehicle depicted in FIG. 1, though it may be understood that the systems and methods depicted herein are not limited to a hybrid vehicle. For example, the systems and methods may be applied to any vehicle comprising an evaporative emission system coupled to a fuel system and an engine, such as the vehicle system depicted in FIG. 2. A method for thoroughly purging a fuel vapor canister of hydrocarbon light ends and hydrocarbon heavy ends, while simultaneously diagnosing whether a canister heating element and a hydrocarbon sensor are functioning as desired, is depicted in FIG. 3. A timeline for conducting the thorough cleaning of the fuel vapor canister and diagnosing the canister heating element and hydrocarbon sensor, is illustrated in FIG. 4.

Figure 1:
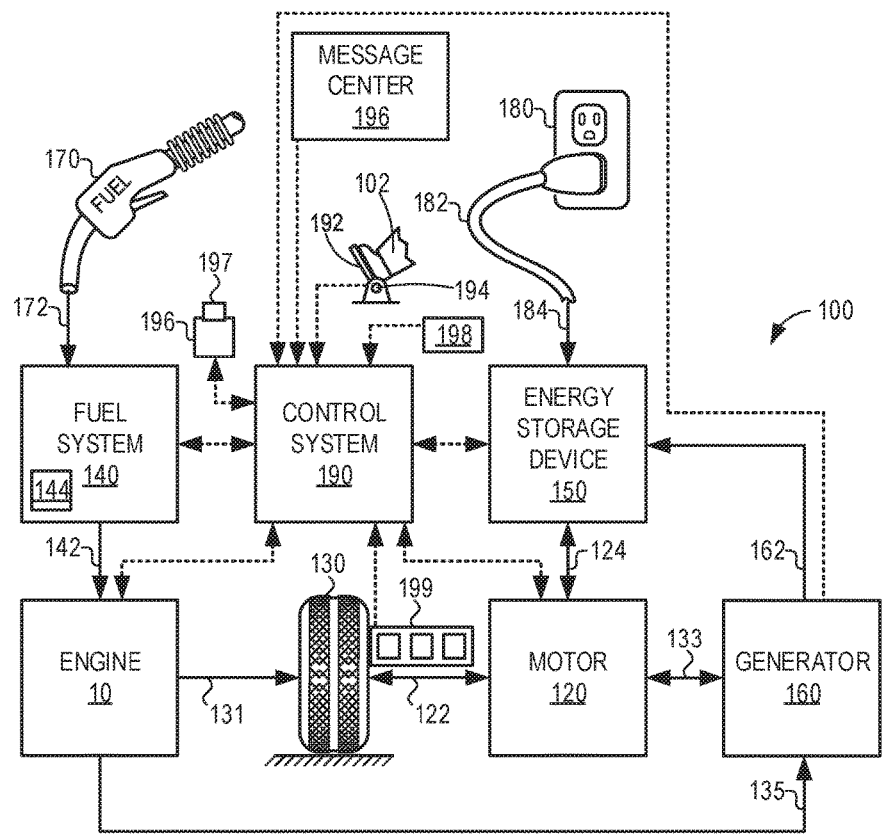
FIG. 1 schematically shows an example vehicle propulsion system.

FIG. 1 illustrates an example vehicle propulsion system 100. Vehicle propulsion system 100 includes a fuel burning engine 10 and a motor 120. As a non-limiting example, engine 10 comprises an internal combustion engine and motor 120 comprises an electric motor. Motor 120 may be configured to utilize or consume a different energy source than engine 10. For example, engine 10 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 10 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 10 is deactivated.

During other operating conditions, engine 10 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 10 may be operated by combusting fuel received from fuel system 140 as indicated by arrow 142. For example, engine 10 may be operated to propel the vehicle via drive wheel 130 as indicated by arrow 131 while motor 120 is deactivated. During other operating conditions, both engine 10 and motor 120 may each be operated to propel the vehicle via drive wheel 130 as indicated by arrows 131 and 122, respectively. A configuration where both the engine and the motor may selectively propel the vehicle may be referred to as a parallel type vehicle propulsion system. Note that in some examples, motor 120 may propel the vehicle via a first set of drive wheels and engine 10 may propel the vehicle via a second set of drive wheels.

In other examples, vehicle propulsion system 100 may be configured as a series type vehicle propulsion system, whereby the engine does not directly propel the drive wheels. Rather, engine 10 may be operated to power motor 120, which may in turn propel the vehicle via drive wheel 130 as indicated by arrow 122. For example, during select operating conditions, engine 10 may drive generator 160 as indicated by arrow 135, which may in turn supply electrical energy to one or more of motor 120 as indicated by arrow 133 or energy storage device 150 as indicated by arrow 162. As another example, engine 10 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 10 as indicated by arrow 142. Still other suitable fuels or fuel blends may be supplied to engine 10, where they may be combusted at the engine to produce an engine output. The engine output may be utilized to propel the vehicle as indicated by arrow 131 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 10, motor 120, fuel system 140, energy storage device 150, and generator 160. As will be described by the process flow of FIG. 6, control system 190 may receive sensory feedback information from one or more of engine 10, motor 120, fuel system 140, energy storage device 150, and generator 160. Further, control system 190 may send control signals to one or more of engine 10, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 10.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 10 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
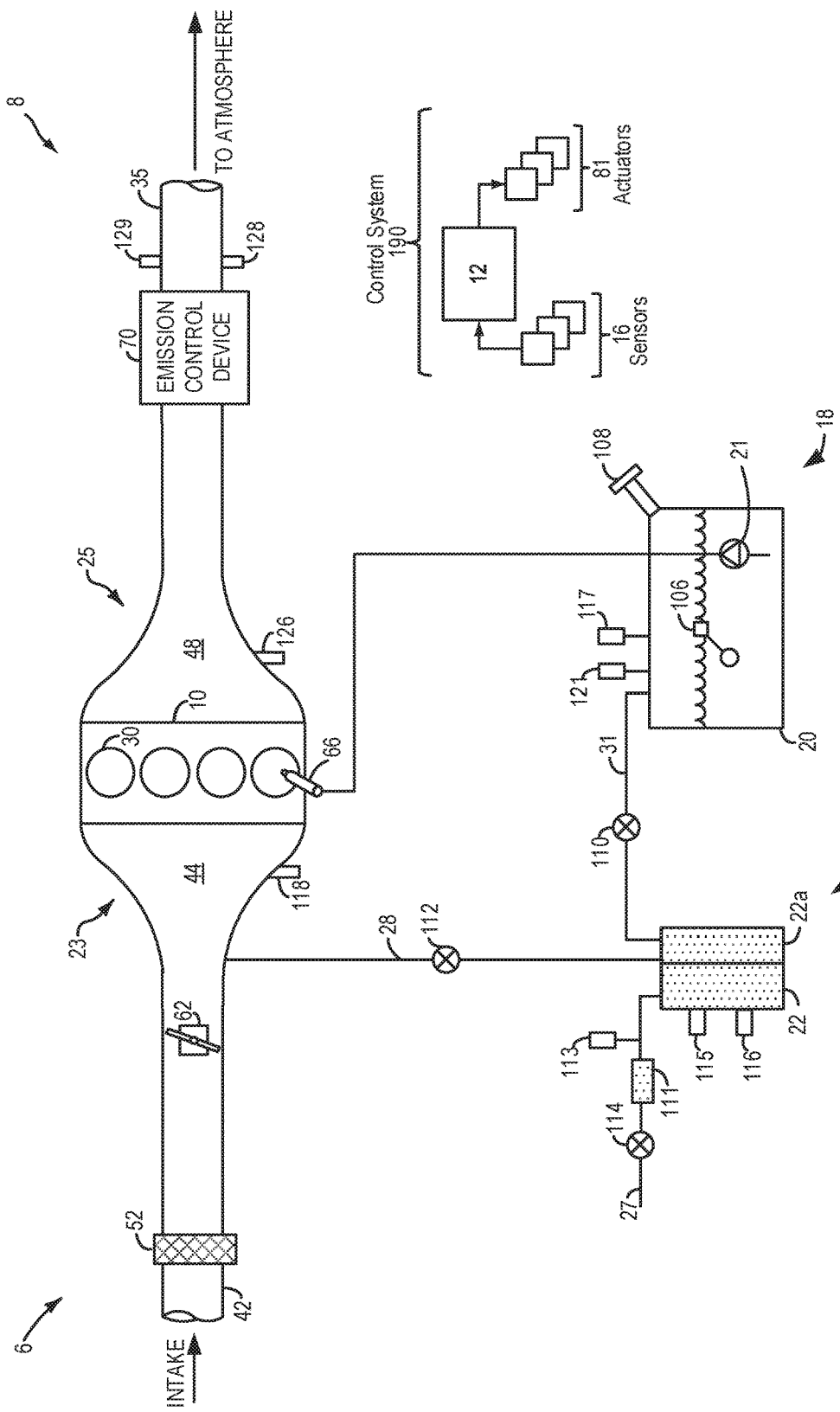
FIG. 2 shows a schematic depiction of a fuel system and evaporative emission system coupled to an engine system.

FIG. 2 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18, and evaporative emissions system 19. Fuel system 18 includes a fuel tank 20 coupled to a fuel pump 21, the fuel tank supplying fuel to an engine 10 which propels a vehicle. Evaporative emissions system 19 includes fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to deliver pressurized fuel to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be in an open position that is closed upon actuation of the canister vent solenoid.

Evaporative emissions system 19 may further include a bleed canister 111. Hydrocarbons that desorb from canister 22 (hereinafter also referred to as the "main canister may be adsorbed within the bleed canister. Bleed canister 111 may include an adsorbent material that is different than the adsorbent material included in main canister 22. Alternatively, the adsorbent material in bleed canister 111 may be the same as that included in main canister 22.

A hydrocarbon sensor 113 may be present in evaporative emissions system 19 to indicate the concentration of hydrocarbons in vent 27. As illustrated, hydrocarbon sensor 113 is positioned between main canister 22 and bleed canister 111. A probe (e.g., sensing element) of hydrocarbon sensor 113 is exposed to and senses the hydrocarbon concentration of fluid flow in vent 27. Hydrocarbon sensor 113 may be used by the engine control system 190 for determining breakthrough of hydrocarbon vapors from main canister 22, in one example.

One or more temperature sensors 115 may be coupled to and/or within canister 22. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister. Further, one or more canister heating elements 116 may be coupled to and/or within canister 22. Canister heating element 116 may be used to selectively heat the canister (and the adsorbent contained within) for example, to increase desorption of fuel vapors prior to performing a purge operation. Heating element 116 may comprise an electric heating element, such as a conductive metal, ceramic, or carbon element that may be heated electrically, such as a thermistor. In some embodiments, heating element 116 may comprise a source of microwave energy, or may comprise a canister jacket coupled to a source of hot air or hot water. Heating element 116 may be coupled to one or more heat exchangers that may facilitate the transfer of heat, (e.g., from hot exhaust) to canister 22. Heating element 116 may be configured to heat air within canister 22, and/or to directly heat the adsorbent located within canister 22. In some embodiments, heating element 116 may be included in a heater compartment coupled to the interior or exterior of canister 22. In some embodiments, canister 22 may be coupled to one or more cooling circuits, and/or cooling fans. In this way, canister 22 may be selectively cooled to increase adsorption of fuel vapors (e.g., prior to a refueling event). In some examples, heating element 116 may comprise one or more Peltier elements, which may be configured to selectively heat or cool canister 22.

Hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 117 may be coupled to fuel system 18 for providing an estimate of a fuel system (and evaporative emissions system) pressure. In one example, the fuel system pressure, and in some example evaporative emissions system pressure as well, is indicated by pressure sensor 117, where pressure sensor 117 is a fuel tank pressure transducer (FTPT) coupled to fuel tank 20. While the depicted example shows pressure sensor 117 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate undesired evaporative emissions based on changes in a fuel tank (and evaporative emissions system) pressure during an evaporative emissions diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 and evaporative emissions system 19 may be operated by controller 12 in a plurality of modes by selective adjustment of the various valves and solenoids. For example, the fuel system and evaporative emissions system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system and evaporative emissions system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before enabling fuel to be added therein. As such, isolation valve 110 may be kept open during the refueling operation to allow refueling vapors to be stored in the canister. After refueling is completed, the isolation valve may be closed.

As yet another example, the fuel system and evaporative emissions system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 190. Control system 190 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 117, hydrocarbon sensor 113, temperature sensor 121, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 190 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 190 may further be configured to receive information via the internet or other communication networks. Information received from the GPS may be cross-referenced to information available via the internet to determine local weather conditions, local vehicle regulations, etc.

Control system 190 may use the internet to obtain updated software modules which may be stored in non-transitory memory.

The control system 190 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. An example control routine is described herein with regard to FIG. 3.

Controller 12 may also be configured to intermittently perform evaporative emissions detection routines on fuel system 18 and evaporative emissions system 19 to determine the presence or absence of undesired evaporative emissions in the fuel system and/or evaporative emissions system. As such, various diagnostic evaporative emissions diagnostic tests may be performed while the engine is off (engine-off evaporative emissions test) or while the engine is running (engine-on evaporative emissions test). Evaporative emissions tests performed while the engine is running may include applying a negative pressure on the fuel system and evaporative emissions system for a duration (e.g., until a target vacuum is reached) and then sealing the fuel system and evaporative emissions system while monitoring a change in pressure (e.g., a rate of change in the vacuum level, or a final pressure value). Evaporative emissions tests performed while the engine is not running may include sealing the fuel system and evaporative emissions system following engine shut-off and monitoring a change in pressure. This type of evaporative emissions test is referred to herein as an engine-off natural vacuum test (EONV). In sealing the fuel system and evaporative emissions system following engine shut-off, pressure in such a fuel system and evaporative emissions control system will increase if the tank is heated further (e.g., from hot exhaust or a hot parking surface) as liquid fuel vaporizes. If the pressure rise meets or exceeds a predetermined threshold, it may be indicated that the fuel system and the evaporative emissions control system are free from undesired evaporative emissions. Alternatively, if during the pressure rise portion of the test the pressure curve reaches a zero-slope prior to reaching the threshold, as fuel in the fuel tank cools, a vacuum is generated in the fuel system and evaporative emissions system as fuel vapors condense to liquid fuel. Vacuum generation may be monitored and undesired emissions identified based on expected vacuum development or expected rates of vacuum development. In such an example, the EONV test may be monitored for a period of time based on available battery charge.

As discussed above, hydrocarbon sensor 113 may be configured to detect hydrocarbon breakthrough from canister 22. As such, functionality of hydrocarbon sensor 113 may thus need to be periodically assessed. However, under typical vehicle operating conditions, hydrocarbon sensor 113 may only be exposed to fuel vapor responsive to a hydrocarbon breakthrough event, thus complicating rationalization of the hydrocarbon sensor. For example, if a breakthrough event occurs and the hydrocarbon sensor is not functioning as desired, undesired evaporative emissions may result. Thus, methods for rationalizing the hydrocarbon sensor are provided herein. Briefly, such a method may include activating canister heating element 116 with isolation valve 110 and canister purge valve 112 both closed, and with canister vent valve 114 closed. In other words, the canister heating element may be activated with the fuel vapor canister sealed from atmosphere, from the intake manifold of the engine, and from the fuel tank. Responsive to the canister heating element being activated for a predetermined duration of time or until a predetermined canister temperature is reached, the method may include unsealing the fuel vapor canister from atmosphere by commanding open the canister vent valve, while maintaining the fuel vapor canister sealed from the intake manifold and from the fuel tank. By configuring the evaporative emissions system 19 as such, fuel vapors may desorb and migrate towards hydrocarbon sensor 113, such that functionality of the hydrocarbon sensor may be assessed. In one example, such a method for rationalization of the hydrocarbon sensor may be conducted subsequent to purging hydrocarbon light ends from canister 22, such that heating of the canister may selectively serve to desorb hydrocarbon heavy ends from the canister. By selectively heating the canister only to desorb hydrocarbon heavy ends, in some examples, battery power may be conserved.

Furthermore, heating of the canister 22 in order to conduct rationality test(s) on hydrocarbon sensor 113 may in some examples provide an opportunity to additionally rationalize canister heating element 116. For example, as will be discussed in detail below, the canister heating element may be indicated to be functional responsive to activation of the canister heating element and subsequent to detection of hydrocarbon breakthrough as indicated by hydrocarbon sensor 113. Alternatively, an air/fuel ratio may be indicated via an exhaust gas oxygen sensor 126 positioned in an exhaust manifold of the engine during purging fuel vapors to the intake manifold of the engine, where it may be indicated that the canister heating element is functioning as desired but that the hydrocarbon sensor 113 is not functioning as desired responsive to a rich air/fuel ratio with respect to stoichiometry being indicated during purging, and without an indication of fuel vapors in the vent line subsequent to activation of the canister heating element prior to purging. In still another example, it may be indicated that the canister heating element is not functioning as desired responsive to the absence of an indication of a rich air/fuel ratio during purging subsequent to activation of the canister heating element and unsealing of the fuel vapor canister from atmosphere, and without an indication of fuel vapors in the vent line.

By conducting hydrocarbon sensor rationality tests by heating the canister to selectively desorb hydrocarbon heavy ends, functionality of both the hydrocarbon sensor 113 and canister heating element 116 may be determined. Heating the canister only to selectively desorb hydrocarbon heavy ends may further result in conservation of battery power, as opposed to methods in which the canister heating element is activated to desorb both hydrocarbon light ends and hydrocarbon heavy ends. Furthermore, by selectively desorbing hydrocarbon heavy ends by heating the canister, the canister may be completely cleaned of adsorbed hydrocarbons, thus increasing canister adsorption capacity for future canister hydrocarbon adsorption events.

Turning to FIG. 3, a high level flowchart for an example method 300 for rationalizing an evaporative emissions system hydrocarbon sensor (e.g., 113) and a fuel vapor canister heating element (e.g., 116), while simultaneously thoroughly cleaning the fuel vapor canister (e.g., 22), is shown.

More specifically, method 300 may include actively routing fuel vapors from a fuel vapor canister into a vent line coupling the fuel vapor canister to atmosphere, and diagnosing one or more evaporative emission system components responsive to the routing. Method 300 may further include sequentially purging fuel vapors stored in a fuel vapor storage canister to an intake manifold of a vehicle engine, the fuel vapor storage canister removably coupled to a vehicle fuel tank which supplies fuel to the engine, by, in a first condition, purging the fuel vapor storage canister of hydrocarbon light ends (e.g., propane, butane), and subsequently, in a second condition, purging the fuel vapor storage canister of hydrocarbon heavy ends (heptane, octane). In both the first condition and second condition, purging fuel vapors from the fuel vapor storage canister to the intake manifold may include coupling the fuel vapor canister to the intake manifold and to atmosphere, to draw atmospheric air through the canister and into the intake manifold. Desorption of fuel vapors from the fuel vapor storage canister may be promoted via activation of the canister heating element, wherein the first condition includes purging the fuel vapor storage canister before activation of the canister heating element, and wherein the second condition includes purging the fuel vapor storage canister subsequent to activation of the canister heating element. In such an example, purging the canister before activation of the canister heating element desorbs hydrocarbon light ends in the first condition, but not hydrocarbon heavy ends, and wherein activation of the canister heating element subsequent to purging the fuel vapor canister of hydrocarbon light ends in the first condition promotes desorption of hydrocarbon heavy ends that are subsequently purged to the intake manifold in the second condition.

Method 300 will be described with reference to the systems described herein and shown in FIG. 1, though it should be understood that similar methods may be applied to other systems without departing from the scope of this disclosure. Method 300 may be carried out by a controller, such as controller 12 in FIG. 2, and may be stored at the controller as executable instructions in non-transitory memory. Instructions for carrying out method 300 and the rest of the methods included herein may be executed by the controller based on instructions stored on a memory of the controller and in conjunction with signals received from sensors of the engine system, such as the sensors described above with reference to FIG. 1 and FIG. 2. The controller may employ fuel system and evaporative emissions system actuators, such as canister purge valve (CPV) (e.g. 112), canister vent valve (CVV) (e.g., 114), fuel tank isolation valve (FTIV) (e.g., 110), canister heating element (e.g., 116), etc., according to the method below.

Method 300 begins at 303 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Furthermore, evaluating current operating conditions at 303 may include checking the fuel system, evaporative emissions system, and engine system for potential circuit faults (e.g., open circuit, short circuit, high impedence, etc.). While not explicitly illustrated, any circuit faults detected that may affect interpretation of the results of method 300 depicted herein may result in method 300 being aborted.

Proceeding to 306, method 300 may include indicating whether a refueling event is requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. Such examples are in no way meant to be limiting, and a refueling request may be indicated via any manner known in the art. If, at 306, a request for refueling is not indicated, method 300 may proceed to 309, and may include maintaining the vehicle fuel system and evaporative emissions status. For example, components such as the FTIV (e.g., 110), CVV (e.g., 114), CPV (e.g., 112), refueling lock, and canister heating element (e.g., 116) may be signaled by the controller to maintain their current conformation and/or activity. Method 300 may then end.

Returning to 306, if a request for refueling is indicated, in some examples, method 300 may include depressurizing the fuel tank. For example, the controller (e.g., 12) may open the FTIV and open or maintain open a vent path between the fuel vapor canister and atmosphere (e.g., open CVV), while maintaining the CPV closed, to depressurize the fuel tank before allowing enabling fuel to be added therein. The FTIV may be opened in a manner to depressurize the fuel tank at a predetermined rate, so as to prevent rapid depressurization. For example, FLVV and GVV may cork shut responsive to rapid depressurization. By commanding open the FTIV, the fuel tank may be selectively coupled to adsorbent material contained in a fuel vapor canister positioned in an evaporative emissions system of the vehicle. A refueling lock (not shown), may be maintained locked until the fuel tank pressure decreases to a threshold pressure (e.g., atmospheric pressure), and then commanded to unlock, thus allowing access to the fuel filler neck only following fuel tank depressurization. The FTIV and canister vent path may be maintained open for the duration of the refueling event, to allow refueling vapors to be flowed to the fuel vapor canister, and to allow gasses stripped of refueling vapors to be flowed to atmosphere.

Proceeding to 312, method 300 may include monitoring the refueling event. For example, monitoring the refueling event at 312 may include monitoring fuel level via a fuel tank fill level sensor (e.g., 106) for the duration of the refueling event. In some examples, monitoring the refueling event at 312 may further include monitoring fuel tank pressure (FTP) via a fuel tank pressure sensor (e.g., 117) for the duration of the refueling event. Monitoring FTP may include receiving signals from one or more fuel tank pressure sensors continuously, or at predetermined time intervals such that a predetermined number of fuel tank pressure measurements can be performed over the duration of the refueling event. The predetermined number of fuel tank pressure measurements and the predetermined time intervals may be set depending on a noise characteristic of the sensor and/or fuel tank pressure signal, for example. In one example, the predetermined time interval may be 5 seconds or 10 seconds, or frequent enough to collect a reliable number of pressure measurements representative of the FTP dynamics typically observed during refueling. As another example, the predetermined time interval or predetermined number of fuel tank pressure measurements may be set large enough to reliably measure a rate of change in fuel tank pressure due to a refueling event. Similarly, monitoring fuel level may include the control system receiving information regarding the level of fuel stored in the fuel tank via one or more fuel level sensors, either continuously or at predetermined intervals over the duration of the refueling event.

In some examples, monitoring the refueling event at 312 may further include monitoring a fuel vapor canister loading state via, for example, a temperature sensor (e.g., 115) coupled to and/or within the canister (e.g., 22). As discussed above, as fuel vapor is adsorbed by the adsorbent in the canister, heat is generated, and thus canister loading state may be inferred by monitoring canister temperature via the temperature sensor during the refueling event.

Proceeding to 315, method 300 may include indicating whether the refueling event is complete. For example, completion of refueling at 315 may be indicated when the fuel level has plateaued for a predetermined duration of time. Indicating whether the refueling event is complete may further include an indication that a refueling nozzle has been removed from the fuel filler neck, replacement of a fuel cap, closing of a refueling door, etc. If, at 315 it is indicated that refueling is not complete, method 300 may continue monitoring the fuel level and fuel tank pressure during the refueling event.

Responsive to an indication of completion of the refueling event, if included, the FTIV may be commanded closed to seal the fuel tank. In some examples, vehicle operating conditions may be updated to reflect the recent refueling event. For example, a loading state of a fuel vapor canister may be updated responsive to the refueling event, and a fuel fill level may be updated to reflect the level of fuel in the tank. In some examples, a canister purge schedule may be updated responsive to the loading state of the fuel vapor canister.

Proceeding to 318, method 300 may include purging the canister of hydrocarbon (HC) light ends. For example, purging the canister of HC light ends may commence responsive to purging conditions being met. Purge conditions being met may include an engine-on condition, canister load above a threshold, an intake manifold vacuum above a threshold, an estimate or measurement of temperature of an emission control device such as a catalyst being above a predetermined temperature associated with catalytic operation commonly referred to as light-off temperature, a non-steady state engine condition, and other operating conditions that would not be adversely affected by a canister purge operation.

Responsive to purging conditions being met, purging the canister of HC light ends may include commanding open the CPV (e.g., 112), while commanding open or maintaining open the CVV (e.g., 114). Furthermore, if included, purging the canister of HC light ends may include commanding or maintaining closed the FTIV (e.g., 110). By commanding open the CPV with the CVV open (and the FTIV closed), fresh air may be drawn across the canister, thus desorbing adsorbed hydrocarbons from the canister. Desorbed hydrocarbons may be routed through the open CPV to engine intake (e.g., 44), for combustion. Accordingly, at 320, method 300 may include monitoring the purge flow. For example, one or more exhaust gas oxygen sensors (e.g., 126) may be positioned in the engine exhaust to provide an estimate of a canister load (that is, an amount of fuel vapors stored in the canister). Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), etc. Based on the canister load, and further based on engine operating conditions, such as engine speed-load conditions, a purge flow rate may be determined.

In other examples (not shown), one or more oxygen sensors may be positioned in the engine intake 44, or coupled to the canister 22 (e.g., downstream of the canister), to provide an estimate of canister load. In still further examples, one or more temperature sensors 132 may be coupled to and/or within canister 22. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load.

Proceeding to 323, method 300 may include indicating whether a concentration of purge vapors being routed from the canister to engine intake is below a predetermined threshold. For example, at the start of the purging operation, the exhaust gas oxygen sensor may indicate a rich air/fuel ratio, due to the induction of fuel vapors into the engine for combustion. However, as the fuel vapor canister becomes sufficiently purged of fuel vapors, the exhaust gas oxygen sensor may switch to an indication of a lean air/fuel ratio, due to only air being routed to engine intake via the open CPV. As discussed above, in the absence of activating a canister heating element (e.g., 116), purging of the canister may comprise purging HC light ends, while HC heavy ends may remain in the canister. Accordingly, at 323, it may be indicated whether the purge vapors are below a predetermined threshold, the predetermined threshold indicative of the canister being substantially purged of HC light ends. If, at 323, it is indicated that the concentration of fuel vapors being purged from the canister is not below the predetermined threshold, method 300 may return to 318, where purging of the canister may be continued.

Responsive to an indication that the concentration of fuel vapors being purged from the canister is below the predetermined threshold, method 300 may proceed to 326. At 326, method 300 may include sealing the fuel vapor canister (e.g., 22) from the fuel system (e.g., 18), from engine intake (e.g., 44), and from atmosphere. More specifically, at 326, method 300 may include commanding closed the CPV (e.g., 112) in order to seal the fuel vapor canister from the intake manifold, maintaining closed the FTIV (e.g., 110) to maintain the canister sealed from the fuel system, and commanding closed the CVV (e.g., 114) to seal the fuel vapor canister from atmosphere.

With the canister sealed from engine intake, from the fuel system, and from atmosphere, method 300 may proceed to 329. At 329, method 300 may include activating the canister heating element (e.g., 116). For example, a thermoelectric heating element may be turned on in order to heat the interior of the fuel vapor canister. While a thermoelectric heating element is utilized herein as an example, it may be understood that such an example is not meant to be limiting, and that any mechanism of heating of a fuel vapor canister common in the art may be utilized to heat the canister. In some examples, heating of the canister may be conducted for a predetermined duration of time, where the predetermined time duration may comprise an amount of time during which the canister temperature is increased to a predetermined temperature. In other examples, the canister heating element may be activated and temperature in the canister may be monitored via, for example, the one or more temperature sensor(s) (e.g., 115) coupled to and/or within the canister. In such an example, the canister heating element may be activated until the canister temperature sensor indicates that the desired temperature has been reached.

Activation of the canister heating element at 329 may be conducted such that HC heavy ends are desorbed from the fuel vapor canister. As such, the predetermined time duration of activation of the canister heating element, and/or the predetermined canister temperature reached during activation of the canister heating element may be a function of a temperature or duration of heater activation such that HC heavy ends are effectively desorbed.

Responsive to activating the canister heating element at 329, method 300 may proceed to 332. At 332, method 300 may include unsealing the fuel vapor canister from atmosphere (e.g., coupling the fuel vapor canister to atmosphere), and may include turning off the canister heating element. More specifically, coupling the canister to atmosphere may include commanding open the canister vent valve (e.g., 114). Furthermore, the canister may be maintained sealed from engine intake, by maintaining closed the canister purge valve (e.g., 112), and maintained sealed from the fuel system by maintaining closed the fuel tank isolation valve (e.g., 110). By coupling the canister to atmosphere while maintaining the canister sealed from the fuel system and from engine intake, HC heavy ends desorbed as a result of the activation of the canister heating element may be routed into a vent line coupling the fuel vapor canister to atmosphere. As depicted in FIG. 2, a hydrocarbon sensor (e.g., 113) may be positioned between the fuel vapor canister and atmosphere. As such, the hydrocarbon sensor may be configured to detect hydrocarbon vapor released from the canister, en route to atmosphere. Accordingly, proceeding to 335, method 300 may include indicating whether the HC sensor detects the presence or absence of fuel vapors desorbed from the fuel vapor canister in the vent line.

If, at 335, it is indicated that the HC sensor detects the presence of HC responsive to activation of the canister heating element, method 300 may proceed to 338. At 338, method 300 may include indicating that both the canister heating element (e.g., 116), and the hydrocarbon sensor (e.g., 113), are functioning as desired responsive to the indication of the presence of fuel vapors in the vent line subsequent to activation of the canister heating element. More specifically, because it was indicated at step 323 of method 300 that HC light ends were sufficiently purged from the canister, and because heating of the canister resulted in the HC sensor responding to the presence of HC migrating from the canister, it may be indicated that the heating element is functioning as desired, and that the HC sensor is functioning as desired. Such a result may be stored at the controller (e.g., 12), for example.

Returning to 335, if it is indicated that the HC sensor is not responding subsequent to activation of the canister heating element, method 300 may proceed to 341. At 341, method 300 may include indicating whether a predetermined time duration has elapsed. For example, the predetermined time duration may comprise a predetermined time duration for which, if the heating element were functioning as desired, and if the HC sensor was functioning as desired, HC detection by the HC sensor would likely have occurred. If, at 341, it is indicated that the predetermined time duration has not elapsed, method 300 may return to 335, and may include continuing to monitor for the detection of HC migration stemming from the fuel vapor canister.

At step 344, method 300 includes purging the fuel vapor canister. More specifically, if the HC sensor responded to the presence of HC migrating from the fuel vapor canister at step 338, or if the HC sensor did not respond but yet the predetermined time duration elapsed at step 341, method 300 may include conducting a canister purge operation. For example, if the HC sensor was indicated to respond at 338 to the presence of HC migrating from the canister, then in order to mitigate the possibility of undesired evaporative emissions breaking through to atmosphere, and to clean the canister of HC heavy ends, a purging operation may be conducted. In another example, if the HC sensor did not respond at step 335, and the predetermined time duration elapsed at 341, then it may be that the canister heating element is not functioning as desired, or that the HC sensor is not responding to the presence of desorbed HC migrating from the canister towards atmosphere. In the event that the canister heating element is functioning as desired, yet the HC sensor is not responding, then conducting a purging operation may serve to mitigate the possibility of undesired evaporative emissions being released to atmosphere, while further serving to clean the fuel vapor canister of HC heavy ends. In either case, it may be understood that a bleed canister (e.g., 111) may be positioned in a vent line between the HC sensor and atmosphere, as a means of preventing undesired evaporative emissions from being released to atmosphere, by capturing fuel vapors during actively routing fuel vapors from the fuel vapor canister into the vent line.

Accordingly, at 344, method 300 includes purging the fuel vapor canister of HC heavy ends by maintaining the FTIV (e.g., 110) closed, maintaining the CVV (e.g., 114) open, and by commanding open the CPV (e.g., 112), as discussed above. As discussed above, purging the canister of HC heavy ends may commence responsive to purging conditions being met. Purge conditions being met may include an engine-on condition, an intake manifold vacuum above a threshold, an estimate or measurement of temperature of an emission control device such as a catalyst being above a predetermined temperature, a non-steady state engine condition, etc.

Purge flow may again be monitored at 346, via the one or more exhaust gas oxygen sensors (e.g.,) for example. Other examples may additionally or alternatively include monitoring purge flow via one or more oxygen sensors positioned in the engine intake (e.g., 44), or at a position downstream of the canister, between the canister and engine intake, to provide an estimate of canister load.

Proceeding to 349, it may be indicated whether HC heavy ends are being routed from the fuel vapor canister to engine intake for combustion. In an example where purge flow is being monitored via exhaust gas oxygen sensor(s), an air/fuel ratio may be indicated to be rich responsive to desorbed fuel vapors being routed to engine intake. In another example where purge flow is additionally or alternatively monitored via oxygen sensor(s) positioned in engine intake, a decrease in oxygen may be indicated in engine intake responsive to conducting the purge event. If, at 349 it is indicated that fuel vapors are being purged to engine intake, or more specifically, that HC heavy ends are being purged to engine intake responsive to activation of the heating element as described above, method 300 may proceed to 352.

At 352, method 300 may include indicating the canister heating element is functioning as desired but that the hydrocarbon sensor is not functioning as desired responsive to a rich air/fuel ratio with respect to stoichiometry being indicated during purging at 344, and without an indication of fuel vapors in the vent line subsequent to activation of the canister heating element prior to purging at 344. Alternatively, if it was previously indicated at 338 that both the HC sensor and heating element are functioning as desired, then an indication of HC heavy ends being purged to intake is expected. As such, at 352, either an indication that the heating element is functional but the HC sensor is not functioning as desired may be stored at the controller, or an indication that both the HC sensor and the heating element are functioning as desired, may be stored at the controller. In the case where it is indicated that the HC sensor is not functioning as desired, a malfunction indicator light (MIL) may be illuminated on the vehicle dash, for example, to alert the vehicle operator of the need to service the vehicle.

Proceeding to 354, method 300 may include indicating whether purge vapors being routed from the fuel vapor canister to engine intake are below a predetermined threshold. In other words, it may be indicated whether a canister load is below a predetermined threshold. As discussed above, responsive to the purging operation being monitored via an exhaust gas oxygen sensor, as the fuel vapor canister becomes sufficiently purged of fuel vapors, the exhaust gas oxygen sensor may switch to an indication of a lean air/fuel ratio, as only air and no fuel vapors are being routed to engine intake. In another example where an oxygen sensor is positioned in engine intake, the oxygen sensor may similarly indicate a decrease in oxygen in the intake manifold initially, followed by a return to a baseline as fuel vapors become substantially purged from the canister. Accordingly, at 354, if it is indicated that purge vapors are not below the predetermined threshold, method 300 may continue to purge the canister, until it is indicated that the purge vapors are below the predetermined threshold.

Responsive to an indication that purge vapors are below the predetermined threshold at 354, method 300 may proceed to 357. At 357, method 300 may include discontinuing the purging operation. More specifically, at 357, method 300 may include commanding the CPV (e.g., 112) closed. Furthermore, the FTIV (e.g., 110) may be maintained closed, and the CVV (e.g., 114) may be maintained open. As such, the fuel vapor canister may be sealed from both engine intake, and from the fuel tank, but may be maintained coupled to atmosphere. In other examples, the FTIV may be commanded open, such that diurnal and running loss vapors from the fuel tank may migrate to the fuel vapor canister, for adsorption, prior to exiting to atmosphere.

Proceeding to 360, method 300 may include updating the vehicle evaporative emission system status. For example, at 360, method 300 may include indicating that the fuel vapor canister has been cleaned of stored fuel vapors. More specifically, it may be indicated at 360 that the canister has been cleaned of both HC light ends, and cleaned of HC heavy ends. Such an indication may be stored at the controller (e.g., 12), for example. Updating the status of the vehicle evaporative emissions system status at 360 may additionally include updating a canister purge schedule. For example, responsive to the indication that the fuel vapor canister has been sufficiently cleaned of both HC light ends and HC heavy ends, a future canister purge operation may be postponed, or rescheduled. Method 300 may then end.

Returning to 349, responsive to an indication that fuel vapors are not being purged to engine intake during the purging of the fuel vapor canister, method 300 may proceed to 365. At 365, method 300 may indicate whether the HC sensor was determined to have responded at step 335. If, at 365, it is indicated that vapors are not being purged to engine intake and that the HC sensor did not respond subsequent to activating the canister heating element and coupling the canister to atmosphere, method 300 may proceed to 368. At 368, method 300 may include indicating that the heating element is not functioning as desired responsive to the absence of an indication of a rich air/fuel ratio during purging at 344 subsequent to activation of the canister heating element and unsealing of the fuel vapor canister from atmosphere, and without an indication of fuel vapors in the vent line. If the heating element were functioning as desired, it would be expected that either the HC sensor would have responded, that vapors being purged to intake would have been indicated, or both. As such, at 368, the most likely explanation for the lack of the HC sensor responding in addition to the lack of an indication of vapors being purged to engine intake, is that the canister heating element is not functioning as desired. Accordingly, such a result may be stored at the controller (e.g., 12).

Proceeding to 357, method 300 may include discontinuing the canister purging operation. As discussed above, discontinuing the purging operation may include commanding the CPV closed, maintaining the FTIV closed, and either maintaining open the CVV, or in some examples, commanding closed the CVV.

Continuing to 360, method 300 may include updating the vehicle evaporative emission system status. For example, at 360, method 300 may include indicating that the canister was cleaned of HC light ends, but that the canister was not cleaned of HC heavy ends. It may be further indicated that, while an HC sensor rationality test was conducted, because the canister heating element was indicated to not be functioning as desired, the status of the HC sensor functionality cannot be conclusively determined. Such an indication may include updating the vehicle evaporative emission system status such that an HC sensor rationality test is conducted at the next available opportunity. Furthermore, as the canister heating element was indicated to not be functioning as desired, in some examples a MIL may be illuminated on the vehicle dash to alert the vehicle operator of the need to service the vehicle. Still further, because the canister was cleaned of HC light ends, but not cleaned of HC heavy ends, a canister purge schedule may be updated accordingly. In some examples, the canister purge schedule may be updated such that canister purge operations are conducted more frequently, until the vehicle has been serviced and the canister may again be sufficiently cleaned of both HC light ends and HC heavy ends. Method 300 may then end.

Returning to 365, in some examples it may be determined that, while the HC sensor was indicated to respond subsequent to activation of the canister heating element, vapors being purged from the canister to engine intake may not be indicated. In such an example, method 300 may proceed to 371. At 371, method 300 may include indicating a fault in the evaporative emissions system, or other potential fault. Examples may include potential degradation of the evaporative emission system, whereby vapors being purged from the fuel vapor canister are not reaching engine intake, oxygen sensor(s) positioned in either engine intake or exhaust not functioning as desired, etc. In such an example, a MIL may be illuminated on the vehicle dash, indicating a fault, and alerting the vehicle operator of the need to service the vehicle. Proceeding to 357, method 300 may include discontinuing the purging operation. As discussed above, discontinuing the purging operation may include commanding the CPV closed, maintaining the FTIV closed, and either maintaining open the CVV, or in some examples, commanding closed the CVV.

Continuing to 360, method 300 may include updating the vehicle evaporative emission system status. Updating the vehicle evaporative emission system status may include discontinuing purging operations until it is indicated that the issue of the vehicle being unable to detect fuel vapors being purged from the fuel vapor canister to engine intake has been mitigated. Updating the vehicle evaporative emission system status may include indicating that the fuel vapor canister was purged of HC light ends, and canister loading state may be updated accordingly. In still other examples, purging of the fuel vapor canister may be discontinued, with the exception of conducting a purging operation if HC breakthrough is detected by the HC sensor prior to mitigating the inability to detect fuel vapors being purged to engine intake. For example, responsive to HC breakthrough being detected, a canister purge operation may be initiated at the next available opportunity, to prevent the release of undesired evaporative emissions to atmosphere. In such an example, a duty cycle of the canister purge valve may be adjusted such that fuel vapors are not rapidly introduced into engine intake, so as not to cause driveability issues due to an altered air/fuel ratio, under circumstances where the amount of purge vapors cannot be detected due to the fault in the evaporative emissions system or other fault. Method 300 may then end.

FIG. 4 depicts an example timeline 400 for conducting a fuel vapor canister purging operation, wherein a canister heating element and a hydrocarbon (HC) sensor positioned between the fuel vapor canister and atmosphere, are rationalized, according to the method described herein and with reference to FIG. 3. Timeline 400 includes plot 405, indicating whether a vehicle engine is on or off, and plot 410, indicating whether a refueling event is requested (yes), or not (no), over time. Timeline 400 further includes plot 415, indicating a fuel tank fill level as monitored by a fuel level indicator (FLI), over time. Timeline 400 further includes plot 420, indicating whether a fuel tank isolation valve (FTIV) (e.g., 110) is open or closed, plot 425, indicating whether a canister vent valve (CVV) (e.g., 114) is open or closed, and plot 430, indicating whether a canister purge valve (CPV) (e.g., 112) is open or closed, over time. Timeline 400 further includes plot 435, indicating whether an exhaust gas air/fuel ratio as indicated by, for example, a heated exhaust gas oxygen sensor (HEGO) is at stoichiometry, or is rich, or lean, over time. Dashed line 436 indicates a duration where the engine is off, and thus a measurement of air/fuel ratio is not applicable.

Timeline 400 further includes plot 440, indicating whether a canister heating element (CHE) is on, or off, and plot 445, indicating pressure in a vehicle fuel tank, as monitored by a fuel tank pressure transducer (FTPT) (e.g., 117), over time. Pressure in the fuel tank may be either positive (+), or negative (−) with respect to atmospheric pressure (atm). Timeline 400 further includes plot 450, indicating whether the HC sensor (e.g., 113) responds to the presence of HC migrating from the fuel vapor canister (yes), or not (no), over time. Timeline 400 further includes plot 455, indicating whether the HC sensor is functioning as desired, plot 460, indicating whether the CHE is functioning as desired, and plot 465, indicating whether the HEGO is functioning as desired, over time.

At time t0, the vehicle is in operation, as the engine is on, as indicated by plot 405. Fuel level in the fuel tank, indicated by plot 415, is near empty, yet a request for refueling is not yet indicated, illustrated by plot 410.

Further, at time t0, the fuel tank is sealed via a closed FTIV, indicated by plot 420. A fuel vapor canister (e.g., 22) positioned within an evaporative emission system (e.g., 19) is coupled to atmosphere via an open CVV, indicated by plot 425, but is sealed from engine intake via a closed CPV, indicated by plot 430. An air/fuel ratio, monitored by an HEGO (e.g., 126) positioned in the engine exhaust, is at stoichiometry, indicated by plot 435. A canister heating element is off, indicated by plot 440, and fuel tank pressure is positive with respect to atmospheric pressure, indicated by plot 445.

Still further, at time t0, the HC sensor is not indicating the presence of HC migrating from the fuel vapor canister, illustrated by plot 450, and it is indicated that the HC sensor is functioning as desired, illustrated by plot 455, due to a previous HC rationalization test (or absence of an indication of HC sensor malfunction), for example. Similarly, the canister heating element (CHE) is indicated to be functioning as desired, illustrated by plot 460, responsive to a previous CHE rationalization test (or an absence of an indication of CHE malfunction), for example. Furthermore, the HEGO is indicated to be functioning as desired, illustrated by plot 465, as an air/fuel ratio is being accurately monitored, as discussed above.

At time t1, an engine-off event is indicated, and at time t2, a request for refueling is indicated. As discussed above, a request for refueling may include the vehicle operator depressing a refueling button (e.g., 197) on a vehicle instrument panel in the vehicle or at a refueling door, an attempt to open a refueling door, an attempt to remove a gas cap, etc. Responsive to the request for refueling, the FTIV is commanded open, in order to depressurize the fuel tank prior to enabling fuel to be added to the tank. Accordingly, between time t2 and t3, pressure in the fuel tank, as monitored by the FTPT, returns to atmospheric pressure, the result of coupling the fuel tank to atmosphere via the open FTIV and the open CVV.

Between time t3 and t4, fuel is added to the fuel tank. During the refueling event, pressure in the fuel tank is monitored via the FTPT, and fuel level is monitored via the FLI. Near time t4, pressure in the fuel tank is indicated to rapidly rise, due to a fill level vent valve (not shown) in the fuel tank closing responsive to fuel level in the fuel tank reaching a predetermined fuel fill level. As the fill level vent valve is closed, pressure in the fuel tank rapidly increases, which may thus result in an automatic shutoff of the refueling dispenser. Accordingly, between time t4 and t5, fuel level in the fuel tank plateaus, and pressure in the fuel tank rapidly returns to atmospheric pressure, the result of the refueling dispenser being shutoff.

At time t5, refueling is no longer indicated to be requested, illustrated by plot 410. For example, an indication that refueling is no longer requested may comprise a gas cap being replaced, removal of the refueling dispenser from the fuel filler neck, etc. Accordingly, the FTIV is commanded closed to seal the fuel tank. In some examples, the FTIV may be maintained open, such that diurnal and running loss fuel vapors migrating from the fuel tank may be routed to the fuel vapor canister. However, in this example illustration, the FTIV is commanded closed subsequent to the refueling event.

At time t6, engine operation resumes, indicated by plot 405. With the vehicle operating with the engine on, a canister purge operation may be conducted responsive to canister purge conditions being met. As discussed above, canister purge conditions being met may include a canister load above a threshold, and intake manifold vacuum above a threshold, an estimate or measurement of temperature of an emission control device above a predetermined threshold, a non-steady state engine condition, etc. Between time t6 and t7, it may be understood that conditions for canister purging may be indicated to be met. Thus, at time t7, a canister purging operation is initiated. As discussed above, a canister purging event may be initiated by commanding open the CPV with the CVV open and the FTIV closed. With the evaporative emission system configured as such, intake manifold vacuum may draw fresh air across the fuel vapor canister, thus desorbing stored hydrocarbons from the fuel vapor canister, and routing the desorbed hydrocarbons to engine intake for combustion by the engine. Furthermore, the canister purging operation may be conducted in the absence of activation of the canister heating element, illustrated by plot 440. In other words, the canister heating element (CHE) may be maintained off during the canister purging event. By maintaining the CHE off during the purging event subsequent to the recent refueling event, HC light ends may be effectively purged from the fuel vapor canister without the use of battery power to heat the canister.

During the purging operation, between time t7 and t8, an air/fuel ratio may be monitored, via, for example, the HEGO positioned in the engine exhaust. As HC light ends are purged from the fuel vapor canister, the HEGO may initially indicate a rich response, followed by a switch to a lean response as the canister becomes substantially purged of fuel vapors, and wherein only air is being routed through the CPV to engine intake. Accordingly, at time t8, it may be indicated that the canister is substantially free of HC light ends. In other words, a concentration of fuel vapor in the purge flow may be indicated to be below a predetermined threshold amount. Thus, at time t8, the CPV may be commanded closed, to seal the fuel vapor canister from engine intake, illustrated by plot 430.

As discussed above, while the fuel vapor canister may be effectively purged of HC light ends by drawing atmospheric air across the fuel vapor canister in the absence of activation of the CHE, HC heavy ends may not be effectively desorbed under such conditions. To effectively desorb HC heavy ends may thus necessitate heating of the canister to a predetermined temperature. Accordingly, at time t9, the CHE is indicated to be activated, and the CVV is indicated to be closed. By closing the CVV with the CPV closed and the FTIV closed, the fuel vapor canister may be sealed from engine intake, sealed from the fuel tank, and sealed from atmosphere. By activating the CHE with the fuel vapor canister sealed as described, the fuel vapor canister may be effectively heated to a predetermined temperature, where the predetermined temperature may comprise a temperature that may induce the desorption of HC heavy ends from the fuel vapor canister adsorbent material. As discussed above, in some examples, a canister temperature sensor (e.g., 115) coupled to and/or within the fuel vapor canister may be used to monitor canister temperature, such that the CHE may be activated until the canister temperatures is indicated to reach the predetermined canister temperature. In other examples, the CHE may be activated for a predetermined duration, wherein the predetermined duration may comprise an amount of time whereby the canister may be heated to the predetermined temperature.

Accordingly, between time t9 and t10, the CHE is activated, and the fuel vapor canister is maintained sealed from engine intake, the fuel tank, and from atmosphere. At time t10, it may be understood that the CHE has been activated for the predetermined duration, whereby the canister temperature may be understood to have reached the predetermined temperature. Thus, at time t10, the CHE is indicated to be deactivated, illustrated by plot 440. Furthermore, the CVV is commanded open, to couple the fuel vapor canister to atmosphere, while the FTIV and the CPV are both maintained closed. By commanding open the CVV while maintaining closed the FTIV and the CPV, fuel vapors desorbed from the fuel vapor canister may be routed towards atmosphere, where the HC sensor (e.g., 113) is positioned between the canister and atmosphere. By routing desorbed fuel vapors in the direction of the HC sensor subsequent to heating the canister, a rationalization of the HC sensor may be thus conducted.

The rationalization test of the HC sensor may comprise coupling the fuel vapor canister to atmosphere for a predetermined time period, where the predetermined time period may comprise a duration of time for which if the CHE is functional and HC heavy ends were desorbed, then an HC sensor response would be expected. If the HC sensor is indicated to respond prior to the predetermined time period lapsing, then it may be indicated that the HC sensor is functioning as desired, and a purge operation may be initiated to purge fuel vapors from the canister and vent line. However, if the HC sensor does not respond within the predetermined time period, it may be that the CHE is not functioning as desired, or that the HC sensor is not functioning as desired. If the CHE is functioning as desired, but the HC sensor is not, then in order to prevent undesired evaporative emissions from escaping to atmosphere, a purging operation may thus be conducted, as will be discussed below.

Accordingly, a time duration between time t10 and t11 may comprise the predetermined time period in which desorbed HC heavy ends would be expected to migrate to the HC sensor. However, as indicated by plot 450, the HC sensor does not respond during the duration between time t10 and 11. However, at time t11 it may not be conclusively determined whether the failure to detect HC by the HC sensor is the result of the CHE not functioning as desired, the HC sensor not functioning as desired, or both. Thus, at time t11, a purging operation is initiated. As discussed above, a purging operation may be initiated responsive to purge conditions being met, and in this example illustration, it may be understood that purge conditions are met at time t11. The purging operation is initiated by commanding open the CPV, illustrated by plot 430. During the purging operation, between time t11 and t13, an air/fuel ratio is monitored by the HEGO sensor, illustrated by plot 435. As depicted, the HEGO sensor indicates an initial rich air/fuel ratio, followed by a switch to a lean air/fuel ratio as fuel vapors are cleared from the fuel vapor canister and combusted in the engine, at which point only air is being drawn through the CPV to engine intake.

Because the HEGO responded to fuel vapors in the purge flow, at time t12, it is indicated that the HC sensor is not functioning as desired, but that both the CHE and the HEGO are functioning as desired. More specifically, the CHE may be determined to be functioning as desired as activation of the CHE resulted in additional flow of fuel vapors from the fuel vapor canister to engine intake subsequent to heating the fuel vapor canister. However, because the HC sensor didn't respond, it may be indicated that the HC sensor is not functioning as desired. The results of the rationalization test procedure may be stored at the controller, and a malfunction indicator light may be illuminated on the vehicle dash in order to alert the vehicle operator to service the HC sensor.

At time t13, as the air/fuel ratio is indicated to switch to lean, it may be indicated that the fuel vapor canister is clean of fuel vapors, and the purging operation may be discontinued. Accordingly, the CPV is commanded closed, illustrated by plot 430. Between time t13 and t14, with the CPV closed, air/fuel ratio, as monitored by the HEGO, returns to stoichiometry.

The method depicted in FIG. 3 and accompanying timeline depicted in FIG. 4 illustrate a canister purging operation that enables purging of both HC light ends and HC heavy ends, while simultaneously conducting rationalization tests on a HC sensor (positioned between a fuel vapor canister and atmosphere) and a canister heating element. However, while not explicitly illustrated, it may be understood that the concepts presented herein are not limited to being conducted strictly according to the method depicted herein with regard to FIG. 3. For example, under certain vehicle operating conditions, it may be desirable to conduct a canister purging operation wherein HC light ends and HC heavy ends are purged from the canister, without additionally conducting a HC sensor rationality test. Such an example may include a condition where a HC sensor positioned between the fuel vapor canister and atmosphere has been previously indicated to not be functioning as desired. Another example may include a condition where a vehicle evaporative emission system does not include a hydrocarbon sensor between the fuel vapor canister and atmosphere. Another example may include a condition where a vehicle evaporative emission system does not include a secondary bleed canister. Such examples are illustrative, and in no way meant to be limiting.

An example where a canister may be purged of HC light ends and HC heavy ends, without simultaneously conducting an HC sensor rationality test, may be conducted as follows. Similar to the method depicted in FIG. 3, subsequent to a refueling event, HC light ends may first be purged to engine intake as described above, in the absence of activation of the canister heating element. After it is indicated that the canister is substantially purged of HC light ends, the canister may be sealed from engine intake (e.g., closed CPV), sealed from the fuel tank (e.g., closed FTIV), and sealed from atmosphere (e.g., closed CVV), and a canister heating element may be activated. Following activation of the heating element for a predetermined duration, or until the canister has reached a predetermined temperature threshold, the heating element may be deactivated, and a purging operation may again be conducted responsive to purging conditions being met. In such an example, subsequent to heating the canister, the purging operation may be conducted without first coupling the canister to atmosphere while maintaining the canister sealed from engine intake. Conducting the purging operation in such a fashion may still enable rationalization of the canister heating element, as a rich air/fuel ratio as monitored by an exhaust gas oxygen sensor subsequent to activation of the heating element and purging of the canister may indicate the heating element is functioning as desired.

In another example, it may be desirable under certain vehicle operating conditions to conduct an HC sensor rationalization test differently than that depicted according to the method illustrated in FIG. 3. Specifically, during a refueling event, as fuel vapors are generated in the fuel tank and migrate to the fuel vapor canister for adsorption, the fuel vapor canister temperature may increase as fuel vapors are adsorbed by the adsorption material. In some examples, a refueling event itself may induce breakthrough of fuel vapors from the canister, which may be result in the HC sensor responding to the presence of HC in the vent line coupling the fuel vapor canister to atmosphere, and thus if the HC sensor responds during a refueling event, it may be indicated that the HC sensor is functioning as desired.

However, refueling events may not result in breakthrough of fuel vapors from the fuel vapor canister. Instead, the heat generated during adsorption of the refueling vapors may be utilized advantageously to conduct a HC sensor rationalization test, by subsequently activating a canister heating element to actively induce breakthrough of adsorbed fuel vapors following the refueling event, without first purging HC light ends. Because canister temperature may increase substantially during the refueling event, the canister heating element may only need to be activated for a short time period to induce fuel vapor breakthrough from the canister.

More specifically, following a refueling event, the fuel vapor canister may be sealed from engine intake (e.g., closed CPV), sealed from the fuel tank (e.g., closed FTIV), and sealed from atmosphere (e.g., closed CVV). By sealing the fuel vapor canister from atmosphere, from engine intake, and from the fuel tank, the heat generated from the refueling event may be prevented from being dissipated. Next, instead of purging the canister of HC light ends, the heating element may be activated, thus further heating the canister to induce desorption of fuel vapors. Heating of the canister may be conducted in some examples for a predetermined time duration, or until the canister is indicated to have reached a predetermined canister temperature threshold. Heating of the canister may be conducted in some examples with the CVV maintained closed, whereas in other examples heating of the canister may be conducted with the CVV opened. By heating the canister subsequent to the refueling event and prior to any purging of the canister, the heat of adsorption due to the refueling event may be advantageously utilized, thus enabling the canister heating element to be activated for a reduced time period, which may result in conservation of battery (or other form of onboard energy storage) supply.

In such an example, subsequent to activating the canister heating element and coupling the canister to atmosphere (if the CVV was maintained closed during the activation of the canister heating element), it may be indicated whether the HC sensor responds, thus enabling rationalization of the HC sensor. Similar to the above-described method 300 depicted in FIG. 3, the HC sensor may be monitored for a predetermined duration prior to activating a canister purging operation, such that if the HC sensor does not respond during the predetermined time duration, undesired evaporative emissions are not released to atmosphere.

In this way, a fuel vapor storage canister may be thoroughly cleaned of hydrocarbon light ends and hydrocarbon heavy ends, and by conducting such a cleaning procedure, a canister heating element and a hydrocarbon sensor may additionally be diagnosed as to whether they are functioning as desired. By conducting rationalization tests on the hydrocarbon sensor by actively routing fuel vapors from the fuel vapor storage canister to the vent line coupling the fuel vapor canister to atmosphere, it may be determined whether the hydrocarbon sensor is functioning as desired prior to a potential fuel vapor breakthrough event. Accordingly, undesired evaporative emissions may be reduced. Still further, by thoroughly cleaning the fuel vapor canister of both hydrocarbon light ends, and hydrocarbon heavy ends, functional lifetime of the fuel vapor storage canister may be increased, and potential breakthrough emissions may be reduced.

The technical effect is to recognize that hydrocarbon light ends are readily desorbed by flowing atmospheric air through the fuel vapor canister, while hydrocarbon heavy ends are better desorbed via a motive force in the form of heat. By only heating the canister to desorb hydrocarbon heavy ends, energy stored in a vehicle onboard energy storage device (e.g., battery) may be conserved, as compared to other approaches. A further technical effect is to recognize that, by activating a canister heating element to desorb hydrocarbon heavy ends and then coupling the fuel vapor canister to atmosphere such that fuel vapors are routed to the vent line between the fuel vapor canister and atmosphere prior to being purged to engine intake, both a canister heating element and a hydrocarbon sensor may be rationalized.

The systems described herein and with reference to FIGS. 1-2, along with the methods described herein and with reference to FIG. 3, may enable one or more systems and one or more methods. In one example, a method comprises capturing and storing fuel vapors in a fuel vapor storage canister positioned in a vehicle evaporative emission system, the fuel vapor canister removably coupled to a fuel tank that provides fuel to an engine that propels the vehicle; actively routing fuel vapors from the fuel vapor canister into a vent line coupling the fuel vapor canister to atmosphere; and diagnosing one or more evaporative emission system components responsive to the routing. In a first example of the method, the method further includes wherein actively routing fuel vapors from the fuel vapor canister into the vent line includes activation of a canister heating element coupled to and/or within the fuel vapor canister to promote desorption of fuel vapors stored in the fuel vapor canister. A second example of the method optionally includes the first example and further includes wherein actively routing fuel vapors from the fuel vapor canister further comprises: sealing the fuel vapor canister from atmosphere, from an intake manifold of the engine, and from the fuel tank during activation of the canister heating element; and responsive to the canister heating element being activated for a predetermined duration of time or until a predetermined canister temperature is reached: unsealing the fuel vapor canister from atmosphere while maintaining the fuel vapor canister sealed from the intake manifold and from the fuel tank. A third example of the method optionally includes any one or more or each of the first and second examples and further comprises monitoring the vent line via a hydrocarbon sensor for the presence of fuel vapors subsequent to activation of the canister heating element and unsealing the fuel vapor canister from atmosphere; and wherein diagnosing one or more evaporative emission system components includes indicating that both the canister heating element and the hydrocarbon sensor are functioning as desired responsive to an indication of the presence of fuel vapors in the vent line. A fourth example of the method optionally includes any one or more or each of the first through third examples and further comprises purging fuel vapors to the intake manifold of the engine by unsealing the fuel vapor canister from the intake manifold while maintaining the fuel vapor canister unsealed from atmosphere to draw fresh air through the canister; wherein the purging is conducted responsive to either an indication of fuel vapors in the vent line, or responsive to a predetermined time duration elapsing subsequent to activation of the canister heating element and unsealing of the fuel vapor canister from atmosphere, without an indication of fuel vapors in the vent line. A fifth example of the method optionally includes any one or more or each of the first through fourth examples and further comprises purging fuel vapors to the intake manifold of the engine prior to activating the canister heating element to promote desorption of hydrocarbon light ends from the fuel vapor canister; and wherein diagnosing the canister heating element and the hydrocarbon sensor is not conducted during or prior to purging of hydrocarbon light ends. A sixth example of the method optionally includes any one or more or each of the first through fifth examples and further includes wherein activating the canister heating element subsequent to purging the fuel vapor canister of hydrocarbon light ends serves to promote desorption of hydrocarbon heavy ends stored within the fuel vapor canister that are not purged during purging of the fuel vapor canister in the absence of activation of the canister heating element. A seventh example of the method optionally includes any one or more or each of the first through sixth examples and further comprises indicating an air/fuel ratio via an exhaust gas oxygen sensor positioned in an exhaust manifold of the engine during purging fuel vapors to the intake manifold of the engine; and indicating the canister heating element is functioning as desired but that the hydrocarbon sensor is not functioning as desired responsive to a rich air/fuel ratio with respect to stoichiometry being indicated during purging, and without an indication of fuel vapors in the vent line subsequent to activation of the canister heating element prior to purging. An eighth example of the method optionally includes any one or more or each of the first through seventh examples and further comprises indicating the canister heating element is not functioning as desired responsive to the absence of an indication of a rich air/fuel ratio during purging subsequent to activation of the canister heating element and unsealing of the fuel vapor canister from atmosphere, and without an indication of fuel vapors in the vent line. A ninth example of the method optionally includes any one or more or each of the first through eighth examples and further comprises preventing undesired evaporative emissions from being released to atmosphere during actively routing fuel vapors from the fuel vapor canister into the vent line by capturing fuel vapors in a secondary bleed canister positioned in the vent line between the fuel vapor canister and atmosphere.

Another example of a method comprises sequentially purging fuel vapors stored in a fuel vapor storage canister to an intake manifold of a vehicle engine, the fuel vapor storage canister removably coupled to a vehicle fuel tank which supplies fuel to the engine, by, in a first condition, purging the fuel vapor storage canister of hydrocarbon light ends, and subsequently, in a second condition, purging the fuel vapor storage canister of hydrocarbon heavy ends. In a first example, the method further includes wherein purging fuel vapors from the fuel vapor storage canister to the intake manifold in both the first condition and the second condition includes coupling the fuel vapor canister to the intake manifold and to atmosphere, to draw atmospheric air through the canister and into the intake manifold. A second example of the method optionally includes the first example and further comprises promoting desorption of fuel vapors from the fuel vapor storage canister via activation of a canister heating element; wherein the first condition includes purging the fuel vapor storage canister before activation of the canister heating element; and wherein the second condition includes purging the fuel vapor storage canister subsequent to activation of the canister heating element. A third example of the method optionally includes any one or more or each of the first and second examples and further includes wherein purging the canister before activation of the canister heating element desorbs hydrocarbon light ends in the first condition, but not hydrocarbon heavy ends; and wherein activation of the canister heating element subsequent to purging the fuel vapor canister of hydrocarbon light ends in the first condition promotes desorption of hydrocarbon heavy ends that are subsequently purged to the intake manifold in the second condition. A fourth example of the method optionally includes any one or more or each of the first through third examples and further includes wherein activation of the canister heating element is conducted with the fuel vapor canister sealed from the intake manifold, from the fuel tank, and from atmosphere; and wherein subsequent to activation of the canister heating element for a predetermined duration, or responsive to a canister temperature reaching a predetermined canister temperature threshold, unsealing the fuel vapor canister from atmosphere, to route desorbed fuel vapors into a vent line coupling the fuel vapor canister to atmosphere. A fifth example of the method optionally includes any one or more or each of the first through fourth examples and further comprises indicating the presence or absence of fuel vapors in the vent line via a hydrocarbon sensor; and indicating that both the hydrocarbon sensor and the canister heating element are functioning as desired responsive to an indication of the presence of fuel vapors in the vent line subsequent to activation of the canister heating element. A sixth example of the method optionally includes any one or more or each of the first through fifth examples and further comprises indicating an air/fuel ratio via an exhaust gas oxygen sensor positioned in an exhaust manifold of the engine during purging fuel vapors to the intake manifold of the engine; indicating the canister heating element is functioning as desired but that the hydrocarbon sensor is not functioning as desired responsive to a rich air/fuel ratio with respect to stoichiometry being indicated during purging in the second condition, and without an indication of fuel vapors in the vent line subsequent to activation of the canister heating element prior to purging in the second condition; and indicating the canister heating element is not functioning as desired responsive to the absence of an indication of a rich air/fuel ratio during purging in the second condition subsequent to activation of the canister heating element and unsealing of the fuel vapor canister from atmosphere, and without an indication of fuel vapors in the vent line.

An example of a system for a vehicle comprises a fuel vapor canister positioned in an evaporative emission system; a fuel tank positioned in a fuel system; an engine with an intake manifold and an exhaust manifold; a canister purge valve positioned in a purge conduit between the fuel vapor canister and the intake manifold; a fuel tank isolation valve positioned in a conduit between the fuel tank and the fuel vapor canister; a canister vent valve positioned in a vent line between the fuel vapor canister and atmosphere; a canister heating element, coupled to and/or within the fuel vapor canister; a secondary bleed canister positioned in the vent line between the fuel vapor canister and the canister vent valve; a hydrocarbon sensor positioned in the vent line between the fuel vapor canister and the secondary bleed canister; a controller, storing instructions in non-transitory memory, that when executed, cause the controller to: responsive to an indication of completion of a refueling event: in a first condition, purge fuel vapors stored in the fuel vapor canister to the intake manifold of the engine for combustion by commanding open the canister purge valve and the canister vent valve without prior activation of the canister heating element; in a second condition, purge fuel vapors stored in the fuel vapor canister to the intake manifold of the engine for combustion by commanding open the canister purge valve and the canister vent valve after activation of the canister heating element; and diagnose whether the canister heating element and the hydrocarbon sensor are functioning as desired in the second condition, but not the first condition; where the first condition is commenced prior to the second condition after completion of the refueling event. In a first example, the system further includes wherein the controller further stores instructions in non-transitory memory, that when executed, cause the controller to: in the second condition, command or maintain closed the canister purge valve, the canister vent valve, and the fuel tank isolation valve during activation of the canister heating element until activation of the canister heating element has been conducted for a predetermined time duration or until a canister temperature reaches a canister temperature threshold, and then command open the canister vent valve while maintaining the canister purge valve and fuel tank isolation valve closed to route desorbed fuel vapors into the vent line; and indicate that both the canister heating element and the hydrocarbon sensor are functioning as desired responsive to an indication of the presence of fuel vapors in the vent line as monitored by the hydrocarbon sensor. A second example of the system optionally includes the first example and further comprises an exhaust gas oxygen sensor positioned in the engine exhaust manifold; and wherein the controller further stores instructions in non-transitory memory, that when executed, cause the controller to: indicate an air/fuel ratio via the exhaust gas oxygen sensor in both the first and second condition; and during the second condition, indicate the canister heating element is functioning as desired and that the hydrocarbon sensor is not functioning as desired responsive to a rich air/fuel ratio and the absence of fuel vapors in the vent line; and indicate the canister heating element is not functioning as desired responsive to the absence of a rich air/fuel ratio during purging in the second condition.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
capturing and storing fuel vapors in a fuel vapor canister positioned in a vehicle evaporative emission system, the fuel vapor canister removably coupled to a fuel tank that provides fuel to an engine that propels a vehicle;
actively routing fuel vapors from the fuel vapor canister into a vent line coupling the fuel vapor canister to atmosphere; and
diagnosing one or more evaporative emission system components responsive to the routing.

2. The method of claim 1, wherein actively routing fuel vapors from the fuel vapor canister into the vent line includes activation of a canister heating element coupled to and/or within the fuel vapor canister to promote desorption of fuel vapors stored in the fuel vapor canister.

3. The method of claim 2, wherein actively routing fuel vapors from the fuel vapor canister further comprises:
sealing the fuel vapor canister from atmosphere, from an intake manifold of the engine, and from the fuel tank during activation of the canister heating element; and
responsive to the canister heating element being activated for a predetermined duration of time or until a predetermined canister temperature is reached:
unsealing the fuel vapor canister from atmosphere while maintaining the fuel vapor canister sealed from the intake manifold and from the fuel tank.

4. The method of claim 3, further comprising:
monitoring the vent line via a hydrocarbon sensor for a presence of fuel vapors subsequent to activation of the canister heating element and unsealing the fuel vapor canister from atmosphere;
wherein diagnosing one or more evaporative emission system components includes indicating that both the canister heating element and the hydrocarbon sensor are functioning as desired responsive to an indication of the presence of fuel vapors in the vent line.

5. The method of claim 4, further comprising:
purging fuel vapors to the intake manifold of the engine by unsealing the fuel vapor canister from the intake manifold while maintaining the fuel vapor canister unsealed from atmosphere to draw fresh air through the fuel vapor canister;
wherein the purging is conducted responsive to either an indication of fuel vapors in the vent line, or responsive to a predetermined time duration elapsing subsequent to activation of the canister heating element and unsealing of the fuel vapor canister from atmosphere, without the indication of fuel vapors in the vent line.

6. The method of claim 5, further comprising:
purging fuel vapors to the intake manifold of the engine prior to activating the canister heating element to promote desorption of hydrocarbon light ends from the fuel vapor canister; and
wherein diagnosing the canister heating element and the hydrocarbon sensor is not conducted during or prior to purging of hydrocarbon light ends.

7. The method of claim 6, wherein activating the canister heating element subsequent to purging the fuel vapor canister of hydrocarbon light ends serves to promote desorption of hydrocarbon heavy ends stored within the fuel vapor canister that are not purged during purging of the fuel vapor canister in an absence of activation of the canister heating element.

8. The method of claim 5, further comprising:
indicating an air/fuel ratio via an exhaust gas oxygen sensor positioned in an exhaust manifold of the engine during purging fuel vapors to the intake manifold of the engine; and
indicating the canister heating element is functioning as desired but that the hydrocarbon sensor is not functioning as desired responsive to a rich air/fuel ratio with respect to stoichiometry being indicated during purging, and without the indication of fuel vapors in the vent line subsequent to activation of the canister heating element prior to purging.

9. The method of claim 8, further comprising:
indicating the canister heating element is not functioning as desired responsive to the absence of an indication of a rich air/fuel ratio during purging subsequent to activation of the canister heating element and unsealing of the fuel vapor canister from atmosphere, and without the indication of fuel vapors in the vent line.

10. The method of claim 1, further comprising:
preventing undesired evaporative emissions from being released to atmosphere during actively routing fuel vapors from the fuel vapor canister into the vent line by capturing fuel vapors in a secondary bleed canister positioned in the vent line between the fuel vapor canister and atmosphere.

11. A method comprising:
sequentially purging fuel vapors stored in a fuel vapor storage canister to an intake manifold of a vehicle engine, the fuel vapor storage canister removably coupled to a vehicle fuel tank which supplies fuel to the engine, by, in a first condition, purging the fuel vapor storage canister of hydrocarbon light ends, and subsequently, in a second condition, purging the fuel vapor storage canister of hydrocarbon heavy ends.

12. The method of claim 11, wherein purging fuel vapors from the fuel vapor storage canister to the intake manifold in both the first condition and the second condition includes coupling the fuel vapor storage canister to the intake manifold and to atmosphere, to draw atmospheric air through the fuel vapor storage canister and into the intake manifold.

13. The method of claim 11, further comprising:
promoting desorption of fuel vapors from the fuel vapor storage canister via activation of a canister heating element;
wherein the first condition includes purging the fuel vapor storage canister before activation of the canister heating element; and
wherein the second condition includes purging the fuel vapor storage canister subsequent to activation of the canister heating element.

14. The method of claim 13, wherein purging the fuel vapor storage canister before activation of the canister heating element desorbs hydrocarbon light ends in the first condition, but not hydrocarbon heavy ends; and
wherein activation of the canister heating element subsequent to purging the fuel vapor storage canister of hydrocarbon light ends in the first condition promotes desorption of hydrocarbon heavy ends that are subsequently purged to the intake manifold in the second condition.

15. The method of claim 13, wherein activation of the canister heating element is conducted with the fuel vapor storage canister sealed from the intake manifold, from the fuel tank, and from atmosphere; and wherein subsequent to activation of the canister heating element for a predetermined duration, or responsive to a canister temperature reaching a predetermined canister temperature threshold, unsealing the fuel vapor storage canister from atmosphere, to route desorbed fuel vapors into a vent line coupling the fuel vapor storage canister to atmosphere.

16. The method of claim 15, further comprising:

indicating a presence or an absence of fuel vapors in the vent line via a hydrocarbon sensor; and indicating that both the hydrocarbon sensor and the canister heating element are functioning as desired responsive to the indication of the presence of fuel vapors in the vent line subsequent to activation of the canister heating element.

17. The method of claim 16, further comprising:

indicating an air/fuel ratio via an exhaust gas oxygen sensor positioned in an exhaust manifold of the engine during purging fuel vapors to the intake manifold of the engine;

indicating the canister heating element is functioning as desired but that the hydrocarbon sensor is not functioning as desired responsive to a rich air/fuel ratio with respect to stoichiometry being indicated during purging in the second condition, and without the indication of fuel vapors in the vent line subsequent to activation of the canister heating element prior to purging in the second condition; and indicating the canister heating element is not functioning as desired responsive to the absence of an indication of the rich air/fuel ratio during purging in the second condition subsequent to activation of the canister heating element and unsealing of the fuel vapor storage canister from atmosphere, and without an indication of fuel vapors in the vent line.

18. A system for a vehicle, comprising:

a fuel vapor canister positioned in an evaporative emission system;

a fuel tank positioned in a fuel system;

an engine with an intake manifold and an exhaust manifold;

a canister purge valve positioned in a purge conduit between the fuel vapor canister and the intake manifold;

a fuel tank isolation valve positioned in a conduit between the fuel tank and the fuel vapor canister;

a canister vent valve positioned in a vent line between the fuel vapor canister and atmosphere;

a canister heating element, coupled to and/or within the fuel vapor canister;

a secondary bleed canister positioned in the vent line between the fuel vapor canister and the canister vent valve;

a hydrocarbon sensor positioned in the vent line between the fuel vapor canister and the secondary bleed canister; and a controller, storing instructions in non-transitory memory that, when executed, cause the controller to:

responsive to an indication of completion of a refueling event:

in a first condition, purge fuel vapors stored in the fuel vapor canister to the intake manifold of the engine for combustion by commanding open the canister purge valve and the canister vent valve without prior activation of the canister heating element;

in a second condition, purge fuel vapors stored in the fuel vapor canister to the intake manifold of the engine for combustion by commanding open the canister purge valve and the canister vent valve after activation of the canister heating element; and diagnose whether the canister heating element and the hydrocarbon sensor are functioning as desired in the second condition, but not the first condition;

where the first condition is commenced prior to the second condition after completion of the refueling event.

19. The system of claim 18, wherein the controller further stores instructions in non-transitory memory that, when executed, cause the controller to:

in the second condition, command or maintain closed the canister purge valve, the canister vent valve, and the fuel tank isolation valve during activation of the canister heating element until activation of the canister heating element has been conducted for a predetermined time duration or until a canister temperature reaches a canister temperature threshold, and then command open the canister vent valve while maintaining the canister purge valve and the fuel tank isolation valve closed to route desorbed fuel vapors into the vent line; and indicate that both the canister heating element and the hydrocarbon sensor are functioning as desired responsive to an indication of a presence of fuel vapors in the vent line as monitored by the hydrocarbon sensor.

20. The method of claim 19, further comprising:

an exhaust gas oxygen sensor positioned in the exhaust manifold;

wherein the controller further stores instructions in non-transitory memory that, when executed, cause the controller to:

indicate an air/fuel ratio via the exhaust gas oxygen sensor in both the first and second conditions;

during the second condition, indicate the canister heating element is functioning as desired and that the hydrocarbon sensor is not functioning as desired responsive to a rich air/fuel ratio and an absence of fuel vapors in the vent line; and indicate the canister heating element is not functioning as desired responsive to an absence of the rich air/fuel ratio during purging in the second condition.

* * * * *